Patented May 20, 1924.

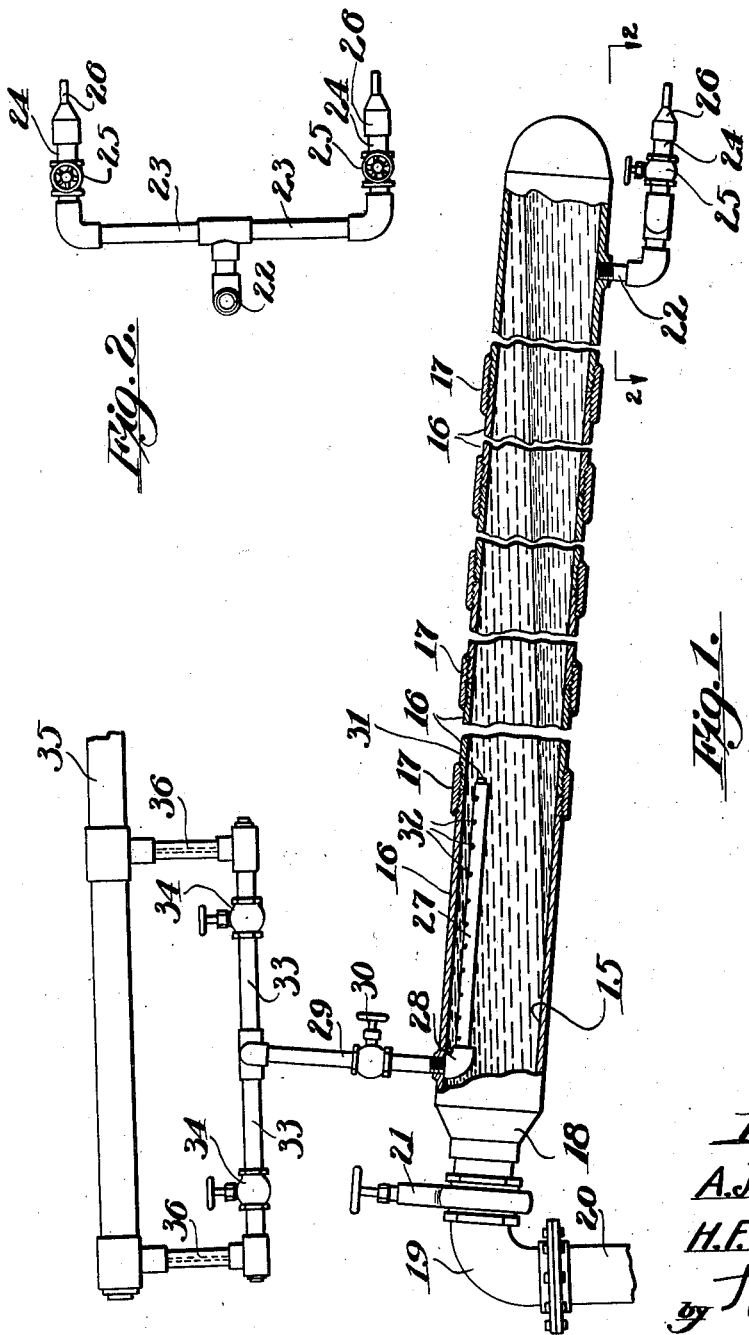

1,494,670

UNITED STATES PATENT OFFICE.

ARTHUR J. DELANEY AND HARRY F. RASNEOR, OF LONG BEACH, CALIFORNIA, ASSIGNORS TO DELANEY-RASNEOR COMPANY, INC., OF LONG BEACH, CALIFORNIA, A CORPORATION OF CALIFORNIA.

SEPARATOR FOR FLOWING OIL WELLS.

Application filed July 27, 1923. Serial No. 654,136.

*To all whom it may concern:*

Be it known that we, ARTHUR J. DELANEY and HARRY F. RASNEOR, citizens of the United States, residing at Long Beach, in the county of Los Angeles and State of California, have invented new and useful Improvements in Separators for Flowing Oil Wells, of which the following is a specification.

Our invention relates to separators for flowing oil wells and consists of the novel features herein shown, described and claimed.

An object of our invention is to make a separator to be attached directly to the upper end of the flow pipe of a flowing oil well and construct the separator and regulate it so as to separate the continuous flow of liquid from the oil well into water, oil and gas, so that the water will flow one way and the oil and gas will flow another way.

Other objects and advantages will appear from the drawings and specification.

In the accompanying drawings,

Fig. 1 is a view showing in side elevation and partly in section one form of separating apparatus embodying our invention.

Fig. 2 is a sectional view taken on the line 2—2 of Fig. 1.

The drawings illustrate the invention.

Referring specifically to the drawings, our invention in its present embodiment is shown as comprising a cylindrical trap or settling chamber designated at 15 which is made of any suitable length and diameter and preferably constructed of ordinary pipe sections 16 connected end to end by conventional couplings 17. Obviously, the diameter and length of the pipe sections vary in accordance with the gas pressure of the well to which the trap is applied. The trap chamber may be arranged at any desired inclination; as for instance, from about three degrees up to sixty degrees with respect to the horizontal, and the inclination depending upon the relative proportion of oil and water in the natural well fluid.

The upper or higher end of the trap is divided with a suitable reducing fitting 18 connected to an elbow 19, with the latter in turn connected to a well casing head 20. A main control valve 21 is interposed in the elbow to control the flow of the well fluid from the casing head into the trap chamber 15. Adjacent the lower end of the trap chamber is a discharge fitting including a depending pipe 22 connected to branch pipes 23 (Fig. 2), and with the latter connected to discharge pipes 24 provided with valves 25 and beans 26. Through this discharge fitting the water which accumulates in the lower end of the chamber 15 may be discharged from the trap as desired through an adjustment of the valves 25.

The oil and gas accumulating in the chamber 15 is adapted to be removed therefrom by means of a skimming device which, in the present instance, is shown as comprising a pipe 27 of suitable diameter and length sustained adjacent the top of the chamber and at the upper end thereof by means of an elbow connection 28 connected to the upper end of the pipe 27 and to an outlet pipe 29 extending exteriorly of the trap and provided with a valve 30 for controlling the passage of oil and gas therethrough. The pipe 27 is preferably arranged at the same inclination as the trap 15 and its lower end is normally closed by a plug 31 while its upper side is provided at intervals with openings 32 through which the oil and gas contained in the trap finds access to the pipe for discharge through the pipe 29.

The outlet pipe 29 is connected to branch pipes 33 provided with valves 34 and connected to an oil and gas line 35 through beans 36.

In practice, the well fluid contained in the casing head or flow pipe 20 of a flow oil well and which is under pressure, is allowed to flow into the chamber 15 when the valve 21 is open. The fluid thus accumulates within the settling chamber, thereby retarding its flow to the extent that it is allowed to stratify, the oil and gas occupying the upper portion of the chamber, and the water occupying the lower portion of the chamber, as clearly shown in Fig. 1. Owing to the existing pressure, the oil and gas are forced into the skimming pipe 27 through the perforations 32, and with the valve 30 in open position the oil and gas are discharged into the branch pipes 33 and finally into the line 35. The water accumulating in the lower portion of the chamber is forced therefrom through the pipe 22 into the branch pipes 23, and from the latter through either of the beans 26, depending upon which valve 25 is open.

It will be noted that the arrangement of pipes, beans, and valves for controlling the discharge of oil, gas and water from the pipes 22 and 29, is such that the discharge of fluid can be restricted to one bean 26, 36 or the other so as to permit the removal and cleaning of those beans which are inactive, thus insuring of the proper discharge of the fluids at all times.

An important feature of our invention is the provision of the skimming device by which simple and effective means is formed to effect the discharge of oil and gas from the trap.

Thus we have produced a separator to be attached to the flow pipe of a flowing oil well and adapted to be operated continuously to separate the flow of liquid into water and oil and gas and continuously discharge the water and continuously discharge the oil and gas and of sufficient capacity to handle the flow of the well, there being outlets and valves for accurately controlling the discharges. It is to be understood that the oil well may be made to flow by natural pressures or by pumping in any of the usual ways.

What we claim is:

1. A separating apparatus of the character described, comprising a trap in which fluids are adapted to stratify, and a skimming device arranged in the trap to be submerged in the uppermost stratum of fluid and into which such fluid is discharged by the pressure of the fluids flowing through the trap.

2. A separating apparatus, comprising a trap into which fluids under pressure continuously flow, said trap being arranged to positively cause the fluids to stratify, and a perforated pipe extending into the trap so as to be submerged in one of the fluid strata and through which one of the fluids is discharged by the pressure of the fluids flowing through the trap.

3. A separating apparatus, comprising a trap in which liquids are adapted to stratify, and valve controlled means extending lengthwise in the trap by which one stratum of liquid can be discharged from the trap by the pressure of the liquid flowing through the trap.

4. A separating apparatus, comprising a trap into which liquids under pressure are adapted to continuously flow, said trap being inclined to positively cause stratification of the liquids, means in the upper portion of the trap and extending lengthwise thereof by which one stratum of fluid can be discharged from the trap by the pressure of the liquid flowing through the trap, and means in the lower portion of the trap by which another stratum of liquid can be discharged therefrom.

5. A separator adapted to be connected directly to the flow pipe of an oil well and comprising a large long downwardly inclined casing having an outlet at the lower side of its lower end, means for controlling the outlet and having a perforated skimming pipe extending longitudinally of the casing and correspondingly inclined inside of the casing near its top and at the upper end of the casing, the oil being discharged through the skimming pipe by the pressure of the liquid flowing through the separator, an outlet pipe leading upwardly from the skimming pipe through the casing, and a valve for controlling the skimming outlet pipe.

In testimony whereof we have signed our names to this specification.

ARTHUR J. DELANEY.
HARRY F. RASNEOR.